(12) United States Patent
Marentis

(10) Patent No.: US 8,557,318 B2
(45) Date of Patent: *Oct. 15, 2013

(54) METHOD OF SUPERCRITICAL FLUID FRACTIONATION OF OIL SEED EXTRACTION MATERIALS

(75) Inventor: Rodger T. Marentis, Macungie, PA (US)

(73) Assignee: MOR Supercritical, LLC, Metropolis, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/428,612

(22) Filed: Mar. 23, 2012

(65) Prior Publication Data

US 2012/0184757 A1 Jul. 19, 2012

Related U.S. Application Data

(63) Continuation of application No. 12/217,497, filed on Jul. 5, 2008, now Pat. No. 8,142,830.

(60) Provisional application No. 60/958,472, filed on Jul. 6, 2007.

(51) Int. Cl.
A23D 9/04 (2006.01)

(52) U.S. Cl.
USPC .............. 426/430; 426/601; 426/417; 554/11

(58) Field of Classification Search
USPC .............................. 426/430, 601, 417; 554/11
See application file for complete search history.

(56) References Cited

U.S. PATENT DOCUMENTS

| | | |
|---|---|---|
| 4,495,207 A | 1/1985 | Christianson et al. |
| 4,898,673 A | 2/1990 | Rice et al. |
| 4,996,072 A | 2/1991 | Marschner et al. |
| 5,097,012 A | 3/1992 | Thies et al. |
| 5,120,558 A | 6/1992 | Nguyen et al. |
| 5,138,075 A | 8/1992 | Ohgaki et al. |
| 5,759,549 A | 6/1998 | Hiltunen et al. |
| 5,932,261 A | 8/1999 | Unnithan |
| 6,177,114 B1 | 1/2001 | Unnithan |
| 6,610,867 B2 | 8/2003 | Jakel et al. |
| 6,800,316 B1 | 10/2004 | Perrut et al. |
| 7,083,954 B2 | 8/2006 | Jakel et al. |
| 7,494,675 B2 | 2/2009 | Abbas et al. |
| 7,612,220 B2 | 11/2009 | DeLine et al. |
| 8,142,830 B2 * | 3/2012 | Marentis ................. 426/430 |
| 2002/0193617 A1 | 12/2002 | Ulrich et al. |
| 2007/0009646 A1 | 1/2007 | Ulrich et al. |

OTHER PUBLICATIONS

U.S. Appl. No. 12/217,497, filed Jul. 5, 2008.
U.S. Appl. No. 60/958,472, filed Jul. 6, 2007.

* cited by examiner

*Primary Examiner* — Anthony Weier
(74) *Attorney, Agent, or Firm* — Craig R. Miles; CR Miles, P.C.

(57) ABSTRACT

Generally, a method of pressure regulated supercritical fluid fractionation of oil seed extraction materials which can be utilized to refine oil seed extraction material established in an amount of supercritical fluid. Specifically, a method of pressure regulated supercritical fluid fractionation of corn germ extraction material to produce a refined corn oil extraction material.

16 Claims, 4 Drawing Sheets

METHOD OF SUPERCRITICAL FLUID FRACTIONATION OF OIL SEED EXTRACTION MATERIALS

Figure 1:
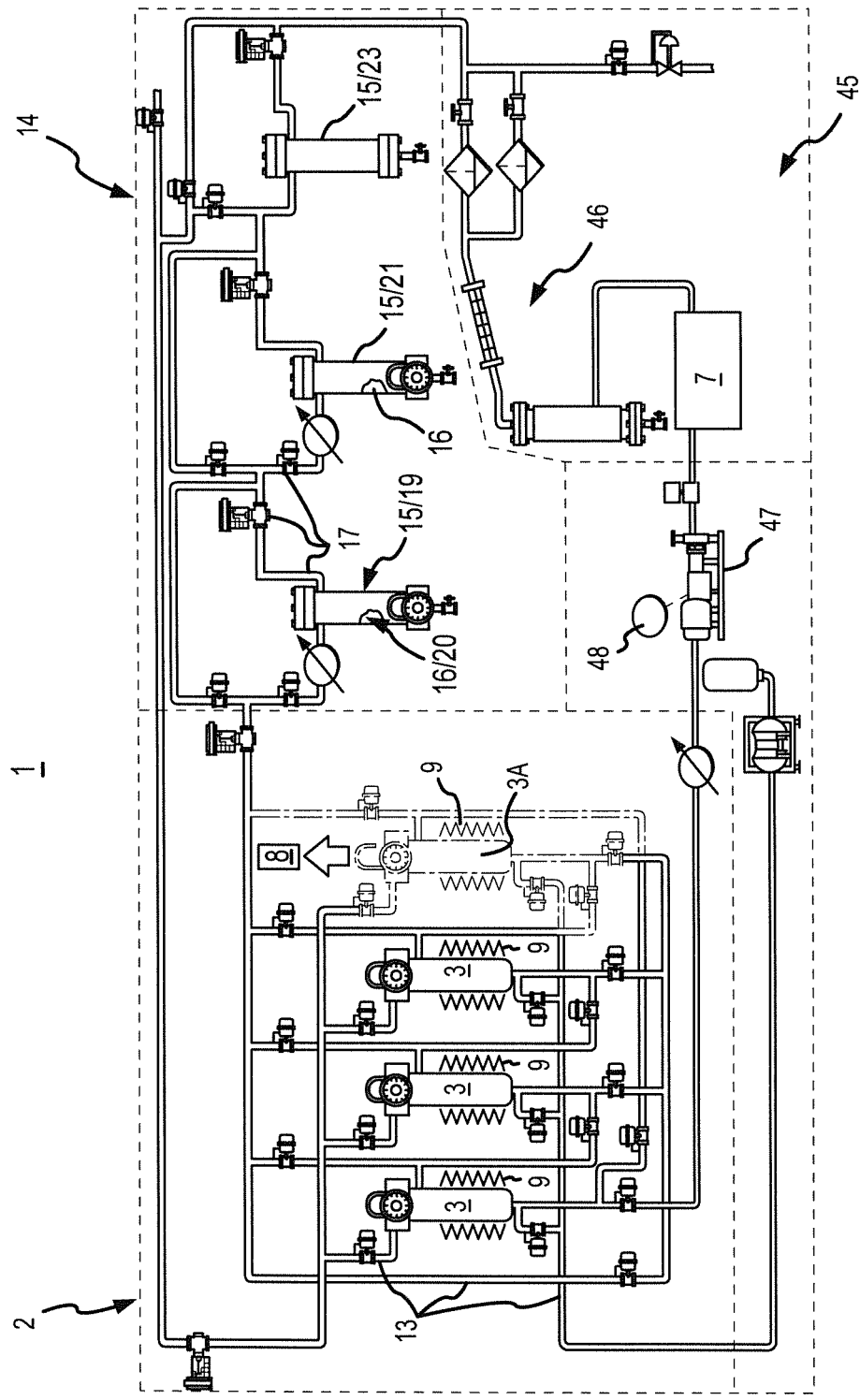

This United States Patent Application is a continuation of U.S. patent application Ser. No. 12/217,497, filed Jul. 5, 2008, now U.S. Pat. No. 8,142,830 which claims the benefit of U.S. Provisional Patent Application No. 60/958,472, filed Jul. 6, 2007, each hereby incorporated by reference herein.

I. BACKGROUND

Generally, a method of pressure regulated supercritical fluid fractionation of oil seed extraction materials which can be utilized to refine oil seed extraction material established in an amount of supercritical fluid. Specifically, a method of pressure regulated supercritical fluid fractionation of corn germ extraction material to produce a refined corn oil extraction material.

Oil Seed extraction materials which include materials extracted from the entirety or parts of various seeds such as corn (typically the corn germ), cotton, rape, safflower, sunflower, flax, or the like, can be generated by a wide variety of extraction methods, such as, solvent extraction, hydraulic pressing, expeller pressing, or the like. Useful solvents for solvent extraction can include hexane, n-hexane, isopropyl alcohol, supercritical fluids, supercritical carbon dioxide, and other similar solvents.

There is a large commercial market for oil seed extraction materials suitably refined to meet the varying standards for direct use as fuels, the production of fuels, the processing of foods, addition to foods, and food. The oil seed extraction materials obtained by these extraction methods exhibit a correspondingly wide range of compositions as mixtures of neutral extraction oils, fatty acids, and a greater or lesser amount of undesired impurities. For example, the undesired impurities in the corn germ extraction material can include one or more of: free fatty acids (FFA) from the degradation of corn germ oil by hydrolysis, phosphatides (hydratable and non-hydratable), organic compounds which contribute certain colors, flavors or odors, particulates entrained by the extracted corn germ extraction material, or the like.

A significant problem with the refining of oil seed extraction material including corn germ extraction material may be that while a wide variety of methods for the extraction of oil seed extraction material from oil seeds have developed over the past decades, relatively few methods of refining oil seed extraction material have developed over the same period. For example, corn germ extraction material continues to be refined by addition of a base such as sodium hydroxide, soda ash, sodium bicarbonate, potassium hydroxide, or the like, which reacts with FFA to produce an emulsion of neutral corn germ extraction oils, a soap mass (often referred to as the "soap stock"), and residual base. The emulsion can centrifuged to separate the neutral corn germ oils from the soap stock and the residual base. The neutral corn germ oils are typically combined with an amount of silica to trap residue soap stock, residual phosphorus, and trace metals. The silica being removed from the neutral corn germ extraction oils by filtration. The resulting neutral corn germ oils may be bleached to reduce color. The corn oil generated may be suitable for a wide variety of uses depending on the exact manner of applying the above-described general steps of the corn germ extraction material refining process.

While this centrifugal refining process is typically suitable for processing oil seed extraction materials and specifically suitable across the wide range of corn germ extraction material compositions generated by the various corn germ extraction material extraction techniques, it has certain disadvantages in that the centrifugal refining process involves the utilization of equipment costly to purchase and maintain, the various extraction processes and the centrifugal refining process may operate separate from one another without significant feed back from the refining process to the extraction process, and without limiting the disadvantages of the centrifugal refining process, may be more costly per unit of refined corn germ extraction material than necessary based upon the higher quality of corn germ extract materials being generated by more recently developed corn germ extraction material extraction processes.

Interestingly, due to the prevalence and overall suitability of conventional centrifugal refining process, developments in the refining of oil seed extraction materials and specifically corn germ extraction materials may not have addressed refining of oil seed extraction materials or corn germ extract materials in bulk by any alternate non-centrifugal extraction material refining process, but rather focus on the production of oil seed extraction material or corn germ extraction material fractions enriched in certain compounds. For example, U.S. Pat. No. 5,932,261 describes a process for production of a carotene rich refined oil fraction from a corn germ extraction material.

To address the unresolved problems associated with the utilization of conventional oil seed and corn germ extraction equipment and methods of refining oil seed extraction materials and specifically corn germ extraction materials, the instant invention provides devices and methods for the pressure regulated supercritical fluid fractionation of oil seed extraction materials and specifically of corn germ extraction materials.

II. SUMMARY OF THE INVENTION

Accordingly, a broad object of embodiments of the invention can be to provide a oil seed material production system which utilizes an amount of a supercritical fluid to remove an amount of oil seed extraction material from ground whole or ground parts of oil seeds and subsequently fractionates the amount of oil seed extraction materials established in the amount of supercritical fluid (also referred herein as the effluent) by passage through a series of oil seed extraction material separation zones each having an adjustable pressure within a fixed temperature range each producing a corresponding oil seed extraction material fraction separable from the effluent in each oil seed extraction material separation zone.

A second broad object of embodiments of the invention can be to provide an oil seed extraction material separator which generates at least one oil seed extraction material fraction suitable for the production of biodiesel or utilization as food grade oil without utilization of conventional productions steps involving generation of soap stock and centrifugation.

A third broad object of embodiments of the invention can be to provide a oil seed extraction material separator which provides three oil seed extraction material separation zones: a first providing an adjustable pressure within a fixed temperature range to generate a phosphatide fraction from an amount of effluent, a second providing an adjustable pressure within a fixed temperature range to generate a triglyceride fraction from an amount of effluent having the phosphatide fraction separated in the first extraction material separation zone, and a third providing an adjustable pressure within a fixed temperature range to generate an FFA fraction from the effluent having the phosphatide fraction separated in the first extraction material separation zone and having the triglyceride fraction separated in the second extraction material separation zone.

A fourth broad object of the invention can be to provide a corn germ extraction material separator which provides three corn germ extraction material separation zones: a first providing an adjustable pressure within a fixed temperature range to generate a phosphatide fraction from an amount of effluent, a second providing an adjustable pressure within a fixed temperature range to generate a triglyceride fraction from an amount of effluent having the phosphatide fraction separated in the first extraction material separation zone, and a third providing an adjustable pressure within a fixed temperature range to generate an FFA fraction from the effluent having the phosphatide fraction separated in the first extraction material separation zone and having the triglyceride fraction separated in the second extraction material separation zone.

Naturally, further objects of the invention are disclosed throughout other areas of the specification, drawings, photographs, and claims.

III. A BRIEF DESCRIPTION OF THE DRAWINGS

FIG. 1 provides a flow diagram of a particular embodiment of an oil seed extraction and oil seed extraction material fractionation system.

Figure 2:
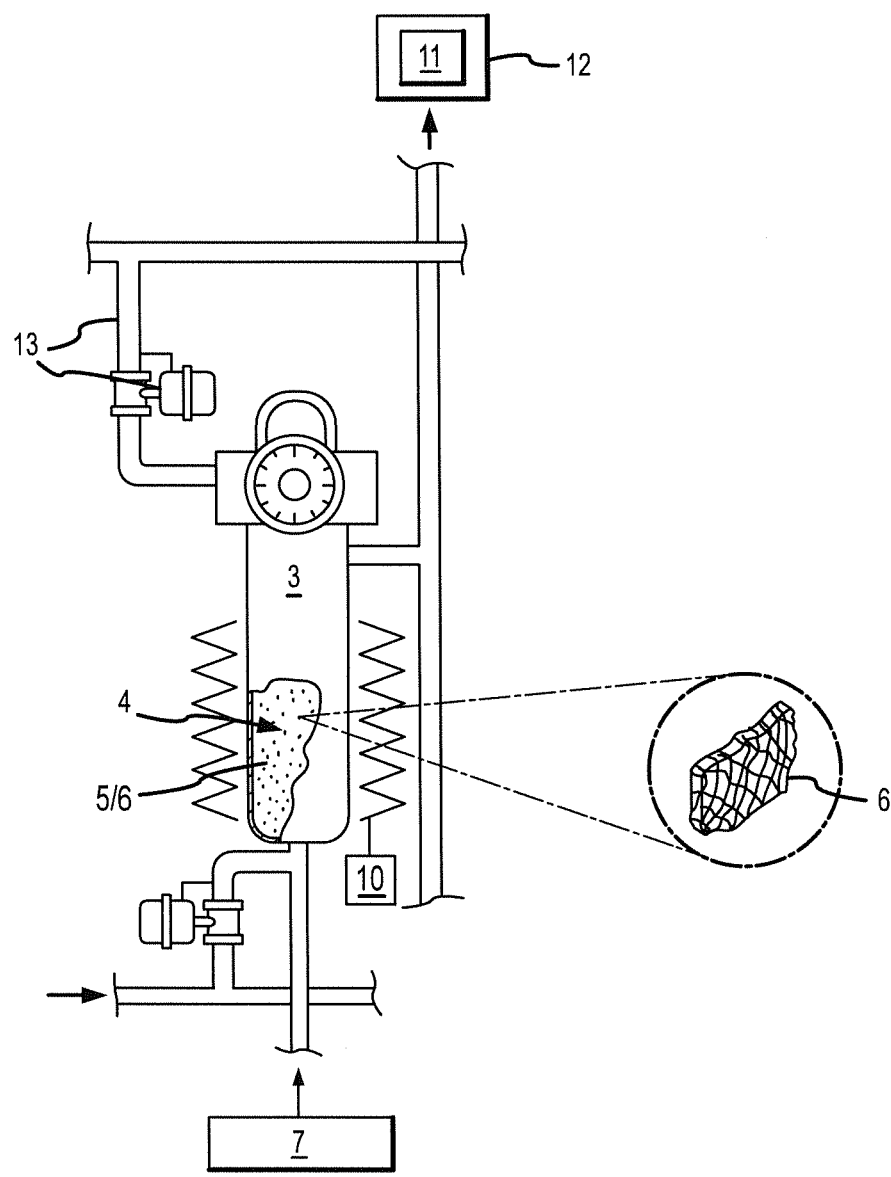

FIG. 2 provides an enlarged portion of the flow diagram shown in FIG. 1 further providing a cut away of a part of an extraction vessel showing the oil seed extraction zone containing an amount of oil seed material.

Figure 3:
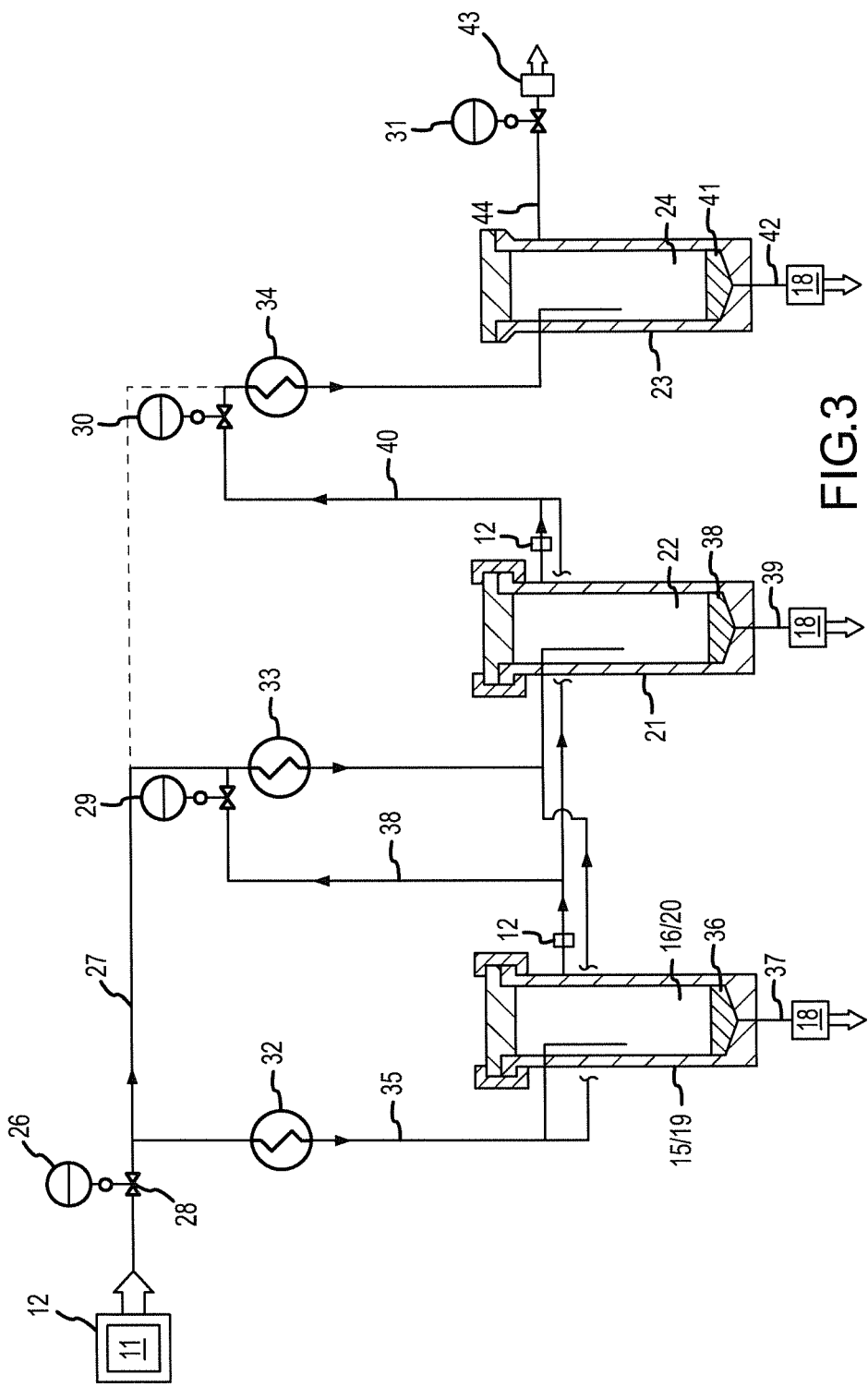

FIG. 3 provides an enlarged portion of the flow diagram shown in FIG. 1 further providing cut away views of the separator vessels included in the oil seed extraction material separator.

Figure 4:
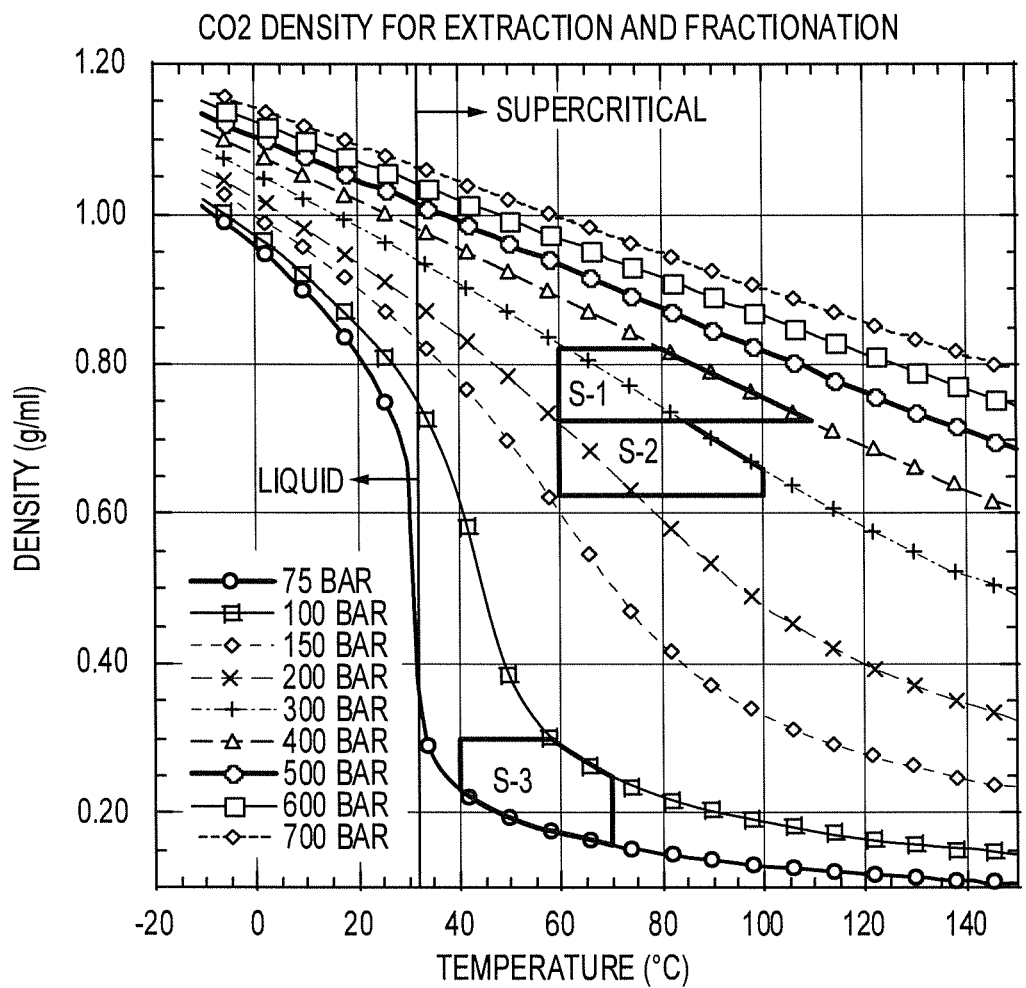

FIG. 4 provides a graph which plots density of supercritical carbon dioxide against temperature for each of a plurality of supercritical carbon dioxide pressures and provides for each of a first separator vessel (S-1), a second separator vessel (S-2), and a third separator vessel (S-3) a corresponding window which bounds the separation parameters in which one of a phosphatide fraction, a triglyceride fraction, or a fatty acid fraction can be separated from an amount of supercritical carbon dioxide in which an amount of corn germ extraction material is established.

IV. DETAILED DESCRIPTION OF THE PREFERRED EMBODIMENTS

Generally, a method of pressure regulated supercritical fluid fractionation of oil seed extraction materials which can be utilized to refine oil seed extraction material established in an amount of supercritical fluid. Specifically, a method of pressure regulated supercritical fluid fractionation of corn germ extraction material to produce a refined corn oil extraction material.

First referring primarily to FIGS. 1 and 2, a non-limiting example of an oil seed extraction material production system (1) is shown. For the purposes of this invention the term "oil seed" or "oil seeds" means the seed of corn, cotton, flax, sunflower, canola, sesame, linseed, soybean, peanuts, copra, safflower, mustard, *brassica*, rapeseed, or the like, whether in whole or comminuted to provide sufficiently small pieces of seed or sufficiently small pieces of a part of the seed compatible with a method of oil extraction and specifically includes as non-limiting example corn germ isolated from whole corn seed. The term "oil seed extraction material" for the purposes of this invention means the materials extracted from the entirety or parts of the various oil seeds by any device or method of removal or extraction, such as, solvent extraction, hydraulic pressing, expeller pressing, including the correspondingly wide range of compositions of neutral extraction oils, fatty acids, and a greater or lesser amount of undesired impurities. The undesired impurities in the oil seed extraction material can include one or more of: free fatty acids (FFA) from the degradation of corn germ oil by hydrolysis, phosphatids (hydratable and non-hydratable), organic compounds which contribute certain colors, flavors or odors, particulates entrained by the extracted corn germ extraction material, or the like.

A non-limiting example of an oil seed extraction material production system (1) which can be used to produce an amount of corn germ extraction material (11) (see FIG. 2) can include a corn germ extractor (2)(for example, the cascade extractor shown in FIG. 1 which provides one or a plurality of corn germ extractor vessels (3) each of which defines a corn germ extraction zone (4) (see FIG. 2) inside of which an amount of corn germ (5) comminuted to provide a plurality of corn germ particles (6) can be located for fluidic engagement with an amount of supercritical carbon dioxide (7) to perform a corn germ extraction event to produce an amount corn germ extraction material (11). Each of the corn germ extractor vessels (3) can independently perform an extraction event on an amount of corn germ (5) in manner which allows at least one extractor vessel (3A) (shown in broken lines) to come off line for a period of time after the extraction event sufficient for removal of an amount of extracted corn germ (8) and introduce an amount of corn germ (5) for a subsequent extraction event.

While the embodiment of the corn germ extraction material production system (1) shown in FIG. 1 utilizes a cascade extractor with an amount of supercritical carbon dioxide (7) as the extractant, as more fully described in U.S. patent application Ser. No. 11/716,838, hereby incorporated by reference in the entirety herein, this is not intended to limit the manner in which an amount of corn germ extract material (11) can be obtained from an amount of corn germ (5) or the manner in which an amount of oil seed extract material can be obtain from an amount of oil seed. Rather, it is intended that the description of the corn germ extractor (2) be illustrative with respect to the numerous and varied oil seed extractors and oil seed extraction processes which can be utilized to obtain oil seed extraction material(s) including corn germ extraction materials (11) having the correspondingly wide range of compositions as above-described which can be received by the oil seed extraction material separator (14) (also referred to in the context of the non-limiting example which follows as a corn germ extraction material separator) and processed as further described below.

Again referring primarily to FIGS. 1 and 2, each of the plurality of corn germ extractor vessels (3) can be coupled to a heat source (9) which generates an amount of heat sufficient to maintain the amount of supercritical carbon dioxide (7) at a temperature of between about 70° C. and about 120° C. during fluidic engagement with the amount of corn germ (5) located inside said corn germ extraction zone (4). The heat source (9) can be coupled to a temperature adjustment element (10) which can monitor temperature of the amount of supercritical carbon dioxide (7) in the corn germ extraction zone (4) or can monitor other conditions outside of the corn germ extraction zone such as the amount of corn germ extraction material (11) established (whether solubilized, carried, or entrained) in the amount of supercritical carbon dioxide (7) (the "effluent" (12)) which flows from the corn germ extraction zone (4), or other measure of the efficiency of the extraction event to allow continuous adjustment of the temperature of the amount of supercritical carbon dioxide (7) in the corn germ extraction zone (4) to maintain a preselected temperature, a preselected temperature profile, or a preselected corn germ extraction efficiency profile based on monitoring the effluent (12) from the corn germ extraction zone (4). The corn germ extractor (2) further includes a plurality of conduits and valves (13) configured to allow transfer of the amount of supercritical carbon dioxide (7) into and away from the corn germ extraction zone (4).

Now referring primarily to FIG. 1, the oil seed extraction material production system (1) can further include an oil seed extraction material separator (14) (also referred to as a corn germ extraction material separator in the context of examples of fractionating corn germ extraction material (11)). As one non-limiting example in the context of refining an amount of corn germ extraction material (11), the oil seed extraction material separator (14) can include at least one separator vessel (15) which defines at least one corn oil separation zone (16) in which the amount of corn germ extraction material (11) extracted from the amount of corn germ (5) and established in the amount of supercritical carbon dioxide (or other solvent depending on the extraction method utilized) can be separated from the amount of supercritical carbon dioxide (7) (or other solvent) by establishing one or a plurality of corn germ extraction material separation conditions in the at least one corn germ extraction material separation zone (16). The at least one separator vessel (15) further includes a plurality of separator conduits and valves (17) configured to allow serial transfer of the amount of effluent (12) into or between the at least one corn oil separation zone (16) and transfer of a separated corn germ extraction material fraction (18) and the separated amount of supercritical carbon dioxide (7) away from the at least one corn oil separation zone (16).

Now referring primarily to FIG. 3, a non-limiting example of a corn germ extraction material separator (14) includes a first separator vessel (19) the configuration of the internal surfaces defining within a first corn germ extraction material separation zone (20), a second separator vessel (21) the configuration of the internal surfaces defining within a second corn germ extraction material separation zone (22), and a third separator vessel (23) the configuration of the internal surfaces defining within a third corn germ extraction material separation zone (24).

Now referring primarily to FIGS. 1, 2, and 3, the effluent (12) exiting the corn germ extractor (2) passes serially through each of the first separator vessel (19), the second separator vessel (21), and the third separator vessel (23) each configured to establish conditions in the respective corn germ extraction material separation zones (20) (22) (24) which allow adjustable pressure of the effluent (12) of between about 200 bar to about 400 bar, 150 bar and 300 bar, and about 75 bar to about 100 bar respectively at temperatures respectively fixed at between about 60° C. to about 110° C., about 60° C. to about 100° C. and about 40° C. to about 70° C.

Operation of a main pressure reduction generator (26) coupled to conduit (27), in part controls the pressure in the corn germ extraction material separation zones (20) (22) (24) at the same time the conduit valve (28) controls the flow of effluent (12) to the separator vessels (19) (21) (23). The auxiliary pressure reduction generators (29) (30) (31) downstream of each separator vessel (19) (22) (23) and heat exchangers (32) (33) (34) upstream of each separator vessel (19) (22) (23) operate to control the conditions in each such separator vessel (19) (22) (23). To obtain separated corn germ extraction material fractions (18) from the effluent (12), the effluent (12) flows by operation of the main pressure reduction generator (26) in conduit (27) through a heat exchanger (32) in conduit (35) and into the first separator vessel (19).

For the purposes of describing the present invention, ranges may be expressed as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Moreover, for the purposes of the present invention, the term "a" or "an" entity refers to one or more of that entity. As such, the terms "a" or "an", "one or more" and "at least one" can be used interchangeably herein. Furthermore, an element "selected from the group consisting of" refers to one or more of the elements in the list that follows, including combinations of two or more of the elements.

Now referring primarily to FIGS. 3 and 4, the effluent (12) entering the first corn germ extraction material separation zone (20) in the first separator vessel (19) can be maintained at a fixed temperature in the range of about 60° C. to about 110° C. and the pressure of the effluent (12) can be variably adjusted between about 200 bar and about 400 bar to achieve a density of the supercritical fluid (typically supercritical carbon dioxide) of between about 0.75 g/mL and about 0.85 g/mL to produce a phosphatide fraction (36) (see conditions bounded by block S-1 in FIG. 4). The phosphatide fraction (36) which separates out of the effluent (12) in the first separator vessel (19) can accumulate as a solid material whether at the bottom of the first separator which can be periodically removed or exits through the first separator vessel drain line (37) entrained in an amount of the effluent. This phosphatide fraction (36) comprises any one of or a mixture of various phosphorous containing lipids (or phospholipids) commonly referred to as lecithin which can serve as crystallization nuclei for condensation of flocculants in biodiesel.

Now referring primarily to FIG. 4 and Table 1, an increase in the total amount of the phosphatide fraction (36) can be achieved by fixing the temperature within a narrower temperature range of between about 70° C. and about 90° C. and adjusting pressure of the effluent (12) between about 250 bar and about 350 bar to achieve a density of the supercritical fluid of between about 0.75 g/mL and about 0.85 g/mL. Specifically in the non-limiting context of an amount of corn germ extraction material established in an amount of supercritical carbon dioxide, an even greater increase in total amount of the phosphatide fraction (36) can be achieved within a fixed range of temperature of between about 60° C. and about 70° C. and adjusting pressure of the effluent (12) between about 325 bar and about 350 bar to achieve a density of the supercritical carbon dioxide of between about 0.75 g/mL and about 0.85 g/mL (total phospholipid increases with reduced density to about 0.75 g/mL).

TABLE 1

| | 1st Separator Data | | | |
|---|---|---|---|---|
| Experiment # | Pressure MPa | Temp. ° C. | $CO_2$ Density g/mL | Total Phospholipids Wt. Percent |
| Feedstock | N/A | N/A | | 0.52 |
| SM 70723 | 34.474 | 70 | 0.823 | 0.65 |
| SM 70724 | 27.579 | 55 | 0.832 | 0.26 |

TABLE 1-continued

1st Separator Data

| Experiment # | Pressure MPa | Temp. °C. | $CO_2$ Density g/mL | Total Phospholipids Wt. Percent |
|---|---|---|---|---|
| SM 70725 | 34.474 | 60 | 0.860 | 0.52 |
| SM 70731 | 41.369 | 65 | 0.881 | 0.12 |
| SM 707801 | 48.263 | 70 | 0.897 | 0.12 |
| SM 707802 | 55.158 | 80 | 0.898 | 0.14 |
| SM 707809 | 51.711 | 75 | 0.897 | 0.10 |
| SM 707810 | 44.816 | 70 | 0.881 | 0.10 |

MPa = Megapascals
1 Megapascal = 10 bar

Again referring to Table 1 and in particular referring to Feedstock SM70725 as a non-limiting example, a crude corn oil feedstock can be obtained from ConAgra Foods Inc., Memphis, Tenn. having a phospholipid concentration of 0.52 mg/g. 500 mL of the crude corn oil feedstock was fed through a first separator by a high pressure diaphragm pump enabling countercurrent contact between the crude corn oil feedstock and supercritical carbon dioxide (also referred to as "supercritical $CO_2$"). The temperature in the separator was set at 60° C. in all the sections. The supercritical $CO_2$ supply pressure was maintained at about 34.474 MPa by a $CO_2$ pump. This temperature and pressure provided a pure super critical carbon dioxide density of 0.960 mg/mL. The crude corn oil feedstock was fed into the separator at an average rate of approximately 2.6 mL/min; the supercritical carbon dioxide flow rate was kept at 3 SLPM. Every ten minutes, readings were taken of the pressure inside the first separator, at the $CO_2$ pump and the high pressure diaphragm pump, also the temperatures at the top, center, and bottom of the separator were monitored. Finally the temperatures of supercritical $CO_2$ entering and exiting the column were also recorded. The separator was operated in the manner described above for 120 minutes. A bottom valve of the separator was opened every ten minutes and a sample of liquid that condensed during the previous ten minute period was drawn from the column. After reaching steady-state of pressures, temperatures and flow rates within the column, six samples from the bottom of the extractor were combined and analyzed for phospholipid content. The phospholipid concentration of the crude corn oil feed stock was unchanged by fractionation at these processing conditions and remained at 0.52 mg/g in the separator. Fractionation continued utilizing the same procedure at processing conditions representing both higher and lower pure carbon dioxide densities as shown in Table 1. As can be seen from the table the phospholipid concentrations or amounts begin to selectively concentrate in the first separator below a pure carbon dioxide density of about 825 kg/m³.

Again referring primarily to FIGS. 3 and 4, the resulting effluent (12) proceeds from the first separator vessel (19) through the conduit (38), the auxiliary pressure reduction generator (29) and the heat exchanger (33) into the second separator vessel (21). The temperature of the effluent (12) can be adjusted in the heat exchanger (33), and the pressure of the fluid in the second separator vessel (21) can be adjusted by the downstream pressure reduction generator (30). Fractionation conditions in the second corn germ extraction material separation zone (22) of the second separator vessel (21) can be established to provide a fixed temperature in the range of about 60° C. to about 100° C. and a pressure adjusted within range of about 150 bar to about 300 bar to achieve a density of the supercritical fluid (typically supercritical carbon dioxide) of between about 0.62 g/mL and about 0.75 g/mL to produce a triglyceride fraction (38) (see conditions bounded by block S-2 in FIG. 4). The triglyceride fraction (38) which separates out of the effluent (12) in the second separator vessel (21) exits through the second separator vessel drain line (39). This triglyceride fraction (38) comprises glyceride in which the glycerol is esterified with three fatty acids. It is the main constituent of the corn germ extraction material (11) established in the effluent (12).

Now referring primarily to FIG. 4 and Table 2, conditions can be established in the second corn germ extraction material separation zone (22) which allows the separation of the triglyceride fraction (36) while the free fatty acids remain soluble in the effluent (12). Specifically in the non-limiting context of an amount of corn germ extraction material having the phospholipid fraction removed the triglyceride fraction (36) can be separated while the FFAs remain soluble in the effluent (12) by fixing the temperature within a temperature range of between about 70° C. and about 90° C. and adjusting pressure of the effluent (12) between about 175 bar and about 250 bar to achieve a density of the supercritical fluid of between about 0.62 g/mL and about 0.75 g/mL. Specifically in the non-limiting context of an amount of corn germ extraction material established in an amount of supercritical carbon dioxide, an even greater increase in free fatty acid in the effluent transferred from the second corn germ extraction material separation zone (22) can be achieved within a fixed range of temperature of between about 60° C. and about 65° C. and adjusting pressure of the effluent (12) between about 195 bar and about 250 bar to achieve a density of the supercritical carbon dioxide of between about 0.72 g/mL and about 0.76 g/mL. As to certain embodiments of the invention, even a greater amount of FFAs remain soluble in the effluent (12) at a fixed temperature of about 60° C. and adjusting the pressure to about 0.72 g/mL.

TABLE 2

$2^{nd}$ Separator Data

| Experiment # | Pressure MPa | Temp. °C. | $CO_2$ Density g/mL | Free Fatty Acid in Effluent mg/g |
|---|---|---|---|---|
| Feedstock | N/A | N/A | | 1.74 |
| SM 70613-1 | 19.926 | 60 | 0.722 | 18.82 |
| SM 70614-1 | 25.028 | 65 | 0.762 | 16.26 |
| SM 70615-1 | 20.684 | 55 | 0.764 | 10.99 |
| SM 70618-1 | 19.995 | 45 | 0.813 | 9.63 |
| SM 70618-2 | 23.994 | 75 | 0.698 | 11.70 |
| SM 70619-1 | 17.995 | 45 | 0.789 | 11.58 |

MPa = Megapascals
1 Megapascal = 10 bar

Again referring to Table 2, crude corn oil feedstock was obtained from ConAgra Foods Inc., Memphis, Tenn. with a free fatty acid concentration of 1.74 mg/g. 500 ml of crude corn oil feedstock was fed through the second separator by a high pressure diaphragm pump to enable the countercurrent contact between the feedstock and supercritical $CO_2$. The temperature in the separator column was set at 60° C. in all the sections. The supercritical $CO_2$ supply pressure was 19.926 MPa. This temperature and pressure represented a pure carbon dioxide density of 0.722 g/mL. The feedstock was fed into the column at an average of rate of approximately 2.6 mL/min; the carbon dioxide flow rate was kept at 3 SLPM. Every ten minutes, readings were taken of the pressure inside the column, at the $CO_2$ pump and the diaphragm feedstock pump, also the temperatures at the top, center, and bottom of the fractionation column were monitored. Finally the temperatures of the supercritical $CO_2$ entering and exiting the column were also recorded. The second separator was operated in the manner described above for 120 minutes. After reaching steady-state of pressures, temperatures and flow rates within the column a sample was obtained of the effluent exiting the second separator under steady-state operating conditions and analyzed for FFA composition. The FFA concentration was folded by fractionation at these processing conditions by a factor of about 10.82 from 1.74 mg/g to 18.82 mg/g (see Table 2, SM 70613-1). Fractionation continued utilizing the same procedure at processing conditions representing both higher and lower pure carbon dioxide densities as shown in Table 2. As can be seen from the table the FFA concentrations begin to selectively concentrate approaching 19% in the third separator below a pure carbon dioxide density of about 725 kg/m$^3$.

Now referring primarily to FIGS. 3 and 4, the resulting effluent (12) proceeds from the second separator vessel (21) through the conduit (40), the auxiliary pressure reduction generator (30) and the heat exchanger (34) into the third separator vessel (23). The temperature of the effluent (12) can be adjusted in the heat exchanger (34), and the pressure of the fluid in the third separator vessel (23) can be adjusted by the downstream pressure reduction generator (31). Fractionation conditions in the third corn germ extraction material separation zone (24) of the third separator vessel (23) establish a fixed temperature in the range of about 40° C. to about 70° C. and the pressure can be adjusted within the range of about 75 bar to about 100 bar to achieve a density of the supercritical fluid (typically supercritical carbon dioxide) of between about 0.1 g/mL and about 0.3 g/mL which allows separation of the FFA fraction (41) from the effluent (see conditions bounded by block S-3 in FIG. 4). The FFA fraction (41) which separates out of the effluent (12) in the third separator vessel (23) exits through the third separator vessel drain line (42). This FFA fraction (41) comprises a carboxylic acid often with a long unbranched aliphatic tail (chain), which is either saturated or unsaturated. Carboxylic acids as short as butyric acid (4 carbon atoms) are considered to be fatty acids, while fatty acids derived from natural fats and oils may be assumed to have at least 8 carbon atoms, such as caprylic acid (octanoic acid). In regard to biodiesel production, if the free fatty acid level is too high it may cause problems with soap formation and the separation of the glycerin by-product downstream. It is also known that high free fatty acids levels may not be good for human health.

Now referring primarily to FIG. 4, in increase in total amount of free fatty acids in the FFA fraction (41) can be achieved by fixing the temperature within a narrower temperature range of between about 45° C. and about 65° C. and adjusting pressure of the effluent (12) between about 85 bar and about 95 bar to achieve a density of the supercritical fluid of between about 0.1 g/mL and about 0.3 g/mL. Specifically in the non-limiting context of an amount of corn germ extraction material established in an amount of supercritical carbon dioxide, an even greater increase in total phospholipids in the phosphatide fraction (36) can be achieved within a fixed range of temperature of between about 50° C. and about 60° C. and adjusting pressure of the effluent (12) between about 80 bar and about 90 bar to achieve a density of the supercritical carbon dioxide of between about 0.1 g/mL and about 0.3 g/mL.

It can be appreciated that the corn germ extraction material separator (14) shown in FIG. 3 may be operated with additional separator vessels to re-fractionate any of separated corn germ extraction material fractions (18) to further isolate additional extraction material fractions, or may be operated with additional separator vessels in series to isolate additional extraction material fractions, or may be operated to by-pass the first separator vessel (19) or the second separator vessel (21) or both. Also, a two step fractionation of corn germ extraction material (11) entrained in the effluent (12) can be carried out between the first separator vessel (19) and the second separator vessel (21).

Use of the corn germ extraction material separator (14) as shown in FIG. 3 and utilized as above-describe can yield a quality of food grade corn germ extraction material which exhibits the characteristics set out in Table I.

TABLE I

| ATTRIBUTE | DESCRIPTOR | MIN | MAX | UOM |
|---|---|---|---|---|
| Free Fatty Acids | n/a | 0.01 | 0.06 | % |
| Free Fatty Acids | n/a | 0.01 | 0.05 | % |
| PV | n/a | 0.0 | 0.5 | meq/kg |
| PV | n/a | 0.0 | 1.0 | meq/kg |
| OSI | @110 deg F. | 6.5 | n/a | hours |
| AOM | n/a | 15 | n/a | hours |
| Flavor | Fresh | tbd | tbd | Hedonic |
| Lovibond | Red Color | n/a | 3.0 | n/a |
| Moisture | n/a | n/a | 0.03 | % |
| Fatty Acid Composition | Palmitic Acid | 9.0 | 15.0 | % |
| Fatty Acid Composition | Stearic Acid | 1.0 | 4.0 | % |
| Fatty Acid Composition | Oleic | 24.0 | 29.0 | % |
| Fatty Acid Composition | Linoleic Acid | 55.0 | 63.0 | % |
| Fatty Acid Composition | Linoleic Acid | n/a | <2 | % |
| para-Anisidine | n/a | n/a | 6.0 | avu |
| Phosphorous | n/a | n/a | 5.0 | ppm |

Again referring to FIG. 1, the resulting amount of carbon dioxide (43) proceeds from the third separator vessel (23) through the conduit (44) under the influence of the auxiliary pressure reduction generator (31) to the carbon dioxide recycle assembly (45) (see FIG. 1) which further include a condenser (46) which provides condensing conditions to establish the amount of carbon dioxide (43) in a phase compatible with a pressure generator (47) which establishes and maintains the amount of supercritical carbon dioxide (7) at pressures between about 7,000 psi and about 12,000 psi in the corn germ extraction zone (4). The pressure generator (47) can be coupled to a pressure adjustment element (48) which can monitor the pressure of the amount supercritical carbon dioxide (7) in the corn germ extraction zone (4) or can monitor other conditions outside of the corn germ extraction zone (4) such as the amount of corn oil solubilized in the effluent (12), or other measure of the efficiency of the extraction event to allow continuous adjustment of the pressure of the amount of supercritical carbon dioxide (7) in the corn germ extraction zone (4) to establish or maintain a preselected pressure, a preselected pressure profile, or a preselected corn germ extraction efficiency profile based on monitoring the effluent (12) from the corn germ extraction zone (4).

Now again referring primarily to FIG. 1, it can be understood that if the flow rate of the supercritical carbon dioxide (7) in the corn germ extraction zone (4) has a constant velocity (although in practice the velocity can also be varied) then the effects of the alteration of the supercritical carbon dioxide extraction conditions as to a temperature and a pressure can be evaluated as to effect on a ratio of the amount of supercritical carbon dioxide (7) at a given temperature and pressure to the amount of corn germ (16) (wt./wt.) (also referred to as the "solvent to feed ratio") to reach a particular extraction event end point such as an amount of corn germ extraction material (11) of about twenty percent of the amount of the corn germ (5) (wt./wt.). For example, if the solvent to feed ratio is about 20 to 1 to obtain an amount of corn germ extraction material (11) of twenty percent of the weight of the amount of the corn germ (16) extracted, then for each ton of corn germ extraction material (11) extracted about twenty tons of supercritical carbon dioxide (7) would be utilized. If the solvent to feed ration is about 2 to 1, then for each ton of an amount of corn germ extraction material (11) extracted two tons of supercritical carbon dioxide (7) would be utilized and so forth. If the corn germ extraction material production system (1) processes 300 tons of corn germ (5) per day at a solvent to feed ratio of about 20 to 1 then about 6,000 tons of supercritical carbon dioxide (7) would pass through the corn germ extraction zone (4) of the corn germ extractor (2) and be recovered by the carbon dioxide recycle assembly (45) per day. However, if the corn germ extraction material production system (1) processes the same 300 tons of corn germ (5) per day at a solvent to feed ratio of about 2 to 1 then only 600 tons of supercritical carbon dioxide (7) would pass through the corn germ extraction zone (4) of the corn germ extractor (2) and be recovered by the carbon dioxide recycle assembly (45) per day. Accordingly, the corn germ extractor (2) can be configured to allow for processing of the corresponding amount of effluent (12). Even if the configuration of the corn germ extractor (2) remains substantially the same regardless of the solvent to feed ratio because the mass of the amount of corn germ (5) extracted remains constant, it can be understood that at least the components of the a corn germ extraction material separator (14) and the carbon dioxide recycle assembly (45) would be necessarily scaled upward or downward as solvent to feed ratio increases or decreases.

As can be easily understood from the foregoing, the basic concepts of the present invention may be embodied in a variety of ways. The invention involves numerous and varied embodiments of corn germ extraction material production system and methods of making and using such corn germ extraction material production system and making and using corn germ extraction material. As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "corn oil separator" should be understood to encompass disclosure of the act of "separating corn oil" whether explicitly discussed or not and, conversely, were there effectively disclosure of the act of "separating corn oil", such a disclosure should be understood to encompass disclosure of a "corn oil separator" and even a "means for separating corn oil." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Thus, the applicant(s) should be understood to claim at least: i) each of the corn germ extraction material production systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below, if any, are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A method of fractionating oil seed extraction material, comprising the steps of:
   a) establishing an amount of oil seed extraction material in an amount of supercritical carbon dioxide in a first oil seed extraction material separation zone at a temperature of between about 60° C. and about 110° C.;
   b) adjusting pressure of said amount of oil seed extraction material in said amount of supercritical carbon dioxide in said first oil seed extraction material separation zone to between about 200 bar and about 400 bar to achieve a density of said supercritical fluid of between about 0.75 g/mL and about 0.85 g/mL; and
   c) separating a phosphatide fraction from said oil seed extraction material in said amount of supercritical carbon dioxide resulting in a triglyceride fraction and a fatty acid fraction remaining in said amount of supercritical carbon dioxide.

2. The method of fractionating oil seed extraction material as described in claim 1, further comprising the steps of:
   a) delivering said amount of oil seed extraction material in said amount of supercritical carbon dioxide having said phosphatide fraction separated in said first oil seed extraction material separation zone to a second oil seed extraction material separation zone;
   b) maintaining said amount of oil seed extraction material in said amount of supercritical carbon dioxide having said phosphatid fraction separated in said first oil seed extraction material separation zone at a temperature of between about 60° C. and about 100° C.;
   c) adjusting pressure of said amount of oil seed extraction material in said amount of supercritical carbon dioxide having said phosphatid fraction separated in said first oil seed extraction material separation zone to between about 150 bar and about 300 bar to achieve a density of said supercritical fluid of between about 0.65 g/mL and about 0.75 g/mL; and
   d) separating a triglyceride fraction from said oil seed extraction material in said amount of supercritical carbon dioxide having said phosphatide fraction separated in said first oil seed extraction material separation zone.

3. The method of fractionating oil seed extraction material as described in claim 2, further comprising the steps of:
   a) delivering said amount of oil seed extraction material in said amount of supercritical oil seed having said phosphatide fraction separated in said first oil seed extraction material separation zone and said triglyceride fraction separated in said second oil seed extraction material separation zone to a third oil seed extraction material separation zone;
   b) maintaining said amount of oil seed extraction material in said amount of supercritical carbon dioxide having said phosphatid fraction separated in said first oil seed extraction material separation zone and said triglyceride fraction separated in said second oil seed extraction material separation zone at a temperature of between about 40° C. and about 70° C.;
   c) adjusting pressure of said amount of oil seed extraction material in said amount of supercritical carbon dioxide having said phosphatid fraction separated in said first oil seed extraction material separation zone and said triglyceride fraction separated in said second oil seed extraction material separation zone to between about 75 bar and about 100 bar to achieve a density of said supercritical fluid of between about 0.10 g/mL and about 0.30 g/mL; and
   d) separating an free fatty acid fraction from said oil seed extraction material in said amount of supercritical carbon dioxide having said phosphatid fraction separated in said first oil seed extraction material separation zone and said triglyceride fraction separated in said second oil seed extraction material separation zone.

4. The method of fractionating oil seed extraction material as described in claim 3, wherein said step of maintaining said amount of oil seed extraction material in said amount of supercritical carbon dioxide in said first oil seed extraction material separation zone at a temperature of between about 60° C. and about 110° C. comprises the step of maintaining said amount of oil seed extraction material in said amount of supercritical carbon dioxide in said first oil seed extraction material separation zone at a temperature of between about 70° C. and about 90° C.

5. The method of fractionating oil seed extraction material as described in claim 4, wherein said step of adjusting pressure of said amount of oil seed extraction material in said amount of supercritical carbon dioxide in said first oil seed extraction material separation zone to between about 200 bar and about 400 bar to achieve a density of said supercritical fluid of between about 0.75 g/mL and about 0.85 g/mL comprises the step of adjusting pressure of said amount of oil seed extraction material in said amount of supercritical carbon dioxide in said first oil seed extraction material separation zone to between about 250 bar and about 350 bar to achieve a density of said supercritical fluid of between about 0.75 g/mL and about 0.85 g/mL.

6. The method of fractionating oil seed extraction material as described in claim 5, wherein said step of maintaining said amount of oil seed extraction material in said amount of supercritical carbon dioxide having said phosphatid fraction separated in said first oil seed extraction material separation zone at a temperature of between about 60° C. and about 100° C. comprises the step of maintaining said amount of oil seed extraction material in said amount of supercritical carbon dioxide having said phosphatid fraction separated in said first oil seed extraction material separation zone at a temperature of between about 70° C. and about 90° C.

7. The method of fractionating oil seed extraction material as described in claim 6, wherein said step of adjusting pressure of said amount of oil seed extraction material in said amount of supercritical carbon dioxide having said phosphatid fraction separated in said first oil seed extraction material separation zone to between about 150 bar and about 300 bar to achieve a density of said supercritical fluid of between about 0.65 g/mL and about 0.75 g/mL comprises the step of adjusting pressure of said amount of oil seed extraction material in said amount of supercritical carbon dioxide having said phosphatid fraction separated in said first oil seed extraction material separation zone to between about 175 bar and about 250 bar to achieve a density of said supercritical fluid of between about 0.65 g/mL and about 0.75 g/mL.

8. The method of fractionating oil seed extraction material as described in claim 7, wherein said step of maintaining said amount of oil seed extraction material in said amount of supercritical carbon dioxide having said phosphatid fraction separated in said first oil seed extraction material separation zone and said triglyceride fraction separated in said second oil seed extraction material separation zone at a temperature of between about 40° C. and about 70° C. comprises the step of maintaining said amount of oil seed extraction material in said amount of supercritical carbon dioxide having said phosphatid fraction separated in said first oil seed extraction material separation zone and said triglyceride fraction separated in said second oil seed extraction material separation zone at a temperature of between about 45° C. and about 65° C.

9. The method of fractionating oil seed extraction material as described in claim 8, wherein said step of adjusting pressure of said amount of oil seed extraction material in said amount of supercritical carbon dioxide having said phosphatid fraction separated in said first oil seed extraction material separation zone and said triglyceride fraction separated in said second oil seed extraction material separation zone to between about 75 bar and about 100 bar to achieve a density of said supercritical fluid of between about 0.10 g/mL and about 0.30 g/mL comprises the step of adjusting pressure of said amount of oil seed extraction material in said amount of supercritical carbon dioxide having said phosphatid fraction separated in said first oil seed extraction material separation zone and said triglyceride fraction separated in said second oil seed extraction material separation zone to between about 80 bar and about 95 bar to achieve a density of said supercritical fluid of between about 0.10 g/mL and about 0.30 g/mL.

10. The method of fractionating oil seed extraction material as described in claim 9, wherein said step of maintaining said amount of oil seed extraction material in said amount of supercritical carbon dioxide in said first oil seed extraction material separation zone at a temperature of between about 70° C. and about 90° C. comprises the step of maintaining said amount of oil seed extraction material in said amount of supercritical carbon dioxide in said first oil seed extraction material separation zone at a temperature of between about 75° C. and about 85° C.

11. The method of fractionating oil seed extraction material as described in claim 10, wherein said step of adjusting pressure of said amount of oil seed extraction material in said amount of supercritical carbon dioxide in said first oil seed extraction material separation zone to between about 250 bar and about 350 bar to achieve a density of said supercritical fluid of between about 0.75 g/mL and about 0.85 g/mL comprises the step of adjusting pressure of said amount of oil seed extraction material in said amount of supercritical carbon dioxide in said first oil seed extraction material separation zone to between about 275 bar and about 325 bar to achieve a density of said supercritical fluid of between about 0.75 g/mL and about 0.85 g/mL.

12. The method of fractionating oil seed extraction material as described in claim 11, wherein said step of maintaining said amount of oil seed extraction material in said amount of supercritical carbon dioxide having said phosphatid fraction separated in said first oil seed extraction material separation zone at a temperature of between about 70° C. and about 90° C. comprises the step of maintaining said amount of oil seed extraction material in said amount of supercritical carbon dioxide having said phosphatid fraction separated in said first oil seed extraction material separation zone at a temperature of between about 75° C. and about 85° C.

13. The method of fractionating oil seed extraction material as described in claim 12, wherein said step of adjusting pressure of said amount of oil seed extraction material in said amount of supercritical carbon dioxide having said phosphatid fraction separated in said first oil seed extraction material separation zone to between about 175 bar and about 250 bar to achieve a density of said supercritical fluid of between about 0.65 g/mL and about 0.75 g/mL comprises the step of adjusting pressure of said amount of oil seed extraction material in said amount of supercritical carbon dioxide having said phosphatid fraction separated in said first oil seed extraction material separation zone to between about 195 bar and about 230 bar to achieve a density of said supercritical fluid of between about 0.65 g/mL and about 0.75 g/mL.

14. The method of fractionating oil seed extraction material as described in claim 13, wherein said step of maintaining said amount of oil seed extraction material in said amount of supercritical carbon dioxide having said phosphatid fraction separated in said first oil seed extraction material separation zone and said triglyceride fraction separated in said second oil seed extraction material separation zone at a temperature of between about 45° C. and about 65° C. comprises the step of maintaining said amount of oil seed extraction material in said amount of supercritical carbon dioxide having said phosphatid fraction separated in said first oil seed extraction material separation zone and said triglyceride fraction separated in said second oil seed extraction material separation zone at a temperature of between about 50° C. and about 60° C.

15. The method of fractionating oil seed extraction material as described in claim 14, wherein said step of adjusting pressure of said amount of oil seed extraction material in said amount of supercritical carbon dioxide having said phosphatid fraction separated in said first oil seed extraction material separation zone and said triglyceride fraction separated in said second oil seed extraction material separation zone to between about 80 bar and about 95 bar to achieve a density of said supercritical fluid of between about 0.10 g/mL and about 0.30 g/mL comprises the step of adjusting pressure of said amount of oil seed extraction material in said amount of supercritical carbon dioxide having said phosphatid fraction separated in said first oil seed extraction material separation zone and said triglyceride fraction separated in said second oil seed extraction material separation zone to between about 80 bar and about 90 bar to achieve a density of said supercritical fluid of between about 0.10 g/mL and about 0.30 g/mL.

16. The method of fractionating oil seed extraction material as described in claim 15, wherein oil seed extraction material comprises corn germ extraction material.

* * * * *